United States Patent
Rizzo et al.

[11] Patent Number: 6,062,516
[45] Date of Patent: May 16, 2000

[54] CABLE CLIP MOVEMENT RESTRICTOR

[75] Inventors: Perry Rizzo, Bradford; Steve Ash, Thorphill, both of Canada

[73] Assignee: Atoma International Inc., Ontario, Canada

[21] Appl. No.: 09/069,999

[22] Filed: Apr. 30, 1998

Related U.S. Application Data

[60] Provisional application No. 60/044,434, Apr. 30, 1997.

[51] Int. Cl.[7] ........................................... F16L 3/08
[52] U.S. Cl. ........................................ 248/74.2; 248/316.7
[58] Field of Search .................... 248/67.7, 74.1, 248/74.2, 65, 73, 222.12, 229.26, 316.1, 316.7, 317, 68.1; 74/502.4

[56] References Cited

U.S. PATENT DOCUMENTS

| | | | |
|---|---|---|---|
| 2,166,916 | 7/1939 | Lambard | 248/73 |
| 4,762,296 | 8/1988 | Kraus et al. | 248/74.2 |
| 4,805,479 | 2/1989 | Brightwell | 248/74.2 X |
| 4,840,334 | 6/1989 | Kikuchi | 248/73 |
| 4,917,340 | 4/1990 | Jiiemann et al. | 248/74.2 |
| 5,316,245 | 5/1994 | Ruckwardt | 248/68.1 |
| 5,590,567 | 1/1997 | Marrs et al. | 248/74.2 X |
| 5,669,590 | 9/1997 | Przewodek | 248/68.1 |
| 5,704,573 | 1/1998 | De Beers et al. | 248/73 |
| 5,765,787 | 6/1998 | De Beers et al. | 248/73 |
| 5,845,883 | 12/1998 | Meyer | 248/73 |

*Primary Examiner*—Ramon O. Ramirez
*Assistant Examiner*—Tan Le
*Attorney, Agent, or Firm*—Pillsbury Madison & Sutro, LLP

[57] ABSTRACT

A movement restricting device to be used with a panel member engaging portion slidably mounted on an elongated member, the engaging portion constructed and arranged to be fixedly engaged with a panel member so as to attach the elongated member to the panel member. The movement restricting device comprises a movement restricting portion having a pair of elongated member securing portions. The securing portions are flexible and are disposed to be biased into inwardly gripping engagement with the elongated member such that relative longitudinal movement of said movement restricting portion along the elongated member is substantially prevented. The securing portions have respective longitudinal movement limiting surfaces positioned and configured to restrict sliding longitudinal movement of the panel member engaging portion to a range therebetween.

18 Claims, 1 Drawing Sheet

CABLE CLIP MOVEMENT RESTRICTOR

This application claims the benefit of U.S. Provisional Application Ser. No. 60/044,434, filed Apr. 30, 1997.

The present invention relates to a device for attaching an elongated member, such as a cable, cable sheath, rod or the like to a panel or other object.

Commonly, elongated members, such as cables, are attached to a fixed panel or other object during an assembly process by using a fastening device which is slidably movable in a longitudinal direction along the exterior surface of the cable. These fastening devices are typically permitted to slide freely along the length of the cable. This situation is oftentimes undesirable because it takes extra time in order to search the length of the cable in order to find the fastening device before fastening it to the panel in its final, assembled position, thereby reducing the efficiency of the assembly process. Thus, there exists a need to provide a device which can be easily and quickly located along the cable when installing it on a fixed panel or object. It is also desirable to provide such a device which is also inexpensive to manufacture and relatively simple to use.

It is therefore an object of the present invention to meet the needs described above. The present invention achieves this object by providing a device for attaching an elongated member to a panel member. The device comprises a panel engaging portion and a movement restricting portion. The panel engaging portion is constructed and arranged to be slidably mounted on the elongated member for movement in a longitudinal direction along the elongated member. The panel engaging portion is constructed and arranged to be fixedly engaged with the panel member. The movement restricting portion is constructed and arranged to be mounted on the elongated member in substantially fixed relation. The movement restricting portion has longitudinally spaced movement limiting surfaces positioned and configured to restrict sliding longitudinal movement of the panel member engaging portion along the elongated member to a range therebetween.

Another object of the present invention is to provide movement restricting device to be used with a panel member engaging portion slidably mounted on an elongated member, the engaging portion constructed and arranged to be fixedly engaged with a panel member so as to attach the elongated member to the panel member. The movement restricting device comprises a movement restricting portion having a pair of elongated member securing portions. The securing portions are flexible and are disposed to be biased into inwardly gripping engagement with the elongated member such that relative longitudinal movement of said movement restricting portion along the elongated member is substantially prevented. The securing portions have respective longitudinal movement limiting surfaces positioned and configured to restrict sliding longitudinal movement of the panel member engaging portion to a range therebetween.

Other objects, features and characteristics of the present invention, as well as the method of operation and function of the related elements of the structure, and the combination of the parts and economics of manufacture, will become more apparent upon consideration of the following detailed description and appended claims with reference to the accompanying drawings, all of which form a part of this specification.

DETAILED DESCRIPTION OF THE PREFERRED EMBODIMENTS

Figure 1:
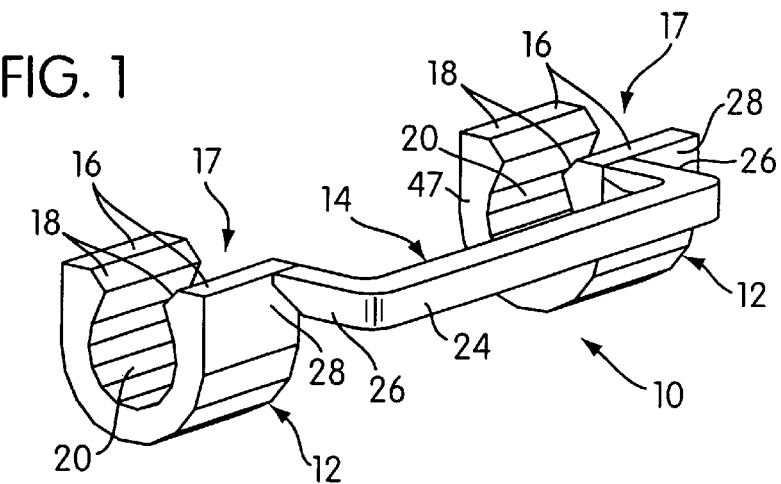
FIG. 1 is a perspective view of a movement restricting device in accordance with the present invention.

FIG. 1 is a perspective view showing a movement restricting device or portion, indicated generally at 10, in accordance with the present invention. The movement restricting portion 10 is preferably made from a flexible plastic material and comprises a pair of spaced resilient tubular member securing portions, each generally indicated at 12. The tubular member securing portions 12 are interconnected by a connecting member, generally indicated at 14.

Each tubular member securing portion 12 is constructed and arranged to be secured to a tubular member in the form of a cable, cable sheath, rod, wire, etc. More particularly, each securing portion 12 has a generally "C" or "U"-shaped configuration (referred to hereinafter as "U"-shaped) having opposing leg portions 16. A pair of angled surfaces 18 are disposed at the ends of the respective opposite leg portions 16 and are sloped radially inwardly and downwardly toward the opening or interior 17 formed in the "U"-shaped configuration. Extending between the pair of angled surfaces 18 is a generally arcuate interior surface 20 constructed and arranged to grippingly engage a cable or the like such that relative axial or longitudinal movement therebetween is substantially prevented. The arcuate surface 20 may be formed by a plurality of adjacent flat surfaces interconnected as shown to provide the arcuate configuration, thus enhancing the gripping action.

The tubular member securing portions 12 are aligned with each other along a longitudinal axis passing through a center of the opening 17 defined by of the "U"-shaped configurations of each tubular member securing portion 12.

A connecting member 14 includes an elongate longitudinal portion 24 disposed parallel to the above-mentioned longitudinal axis. At each of the two ends of the longitudinal portion 24 is a pair of attaching portions 26, which extend laterally outwardly from the opposite ends of the longitudinal portion 24, generally in parallel relation to one another and in perpendicular relation to the longitudinal axis of portion 24. The attaching portions 26 attach each of the tubular member securing portions 12 to opposite ends of the longitudinal portion 24. The connecting member 14 serves primarily to retain the tubular member securing portions 12 in predetermined spaced relation to one another along the longitudinal axis passing therebetween.

Figure 2:
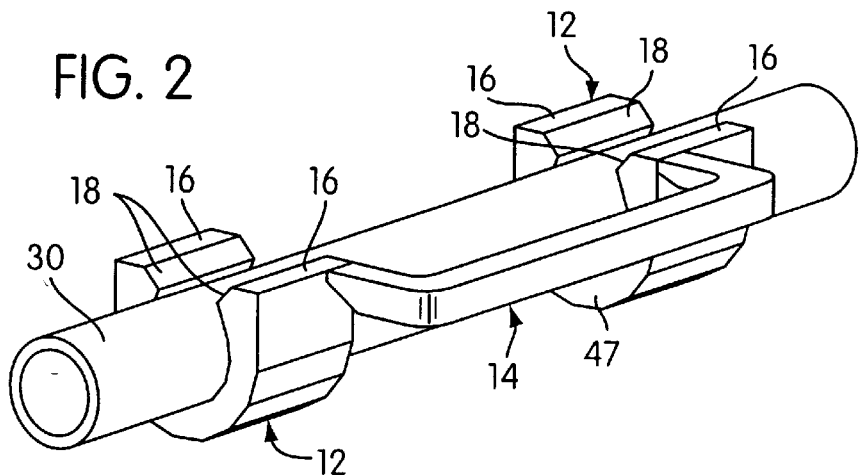
FIG. 2 is a perspective view of the movement restricting device of the present invention secured to a cable or rod.

FIG. 2 shows a cable 30 secured within the openings 17 defined by the "U"-shaped configuration of the tubular member securing portions 12. The cable 30 is pushed against the angled surfaces 18 at the ends of leg portions 16. This pushing action causes the leg portions 16 to flex outwardly to permit the cable to be inserted through the opening 17 in the "U"-shaped securing portions 12 and into engagement with arcuate surface 20. The end portions 16 flex back inwardly over the cable 30 and resiliently return into their original positions to secure the cable 30 in place.

Figure 3:
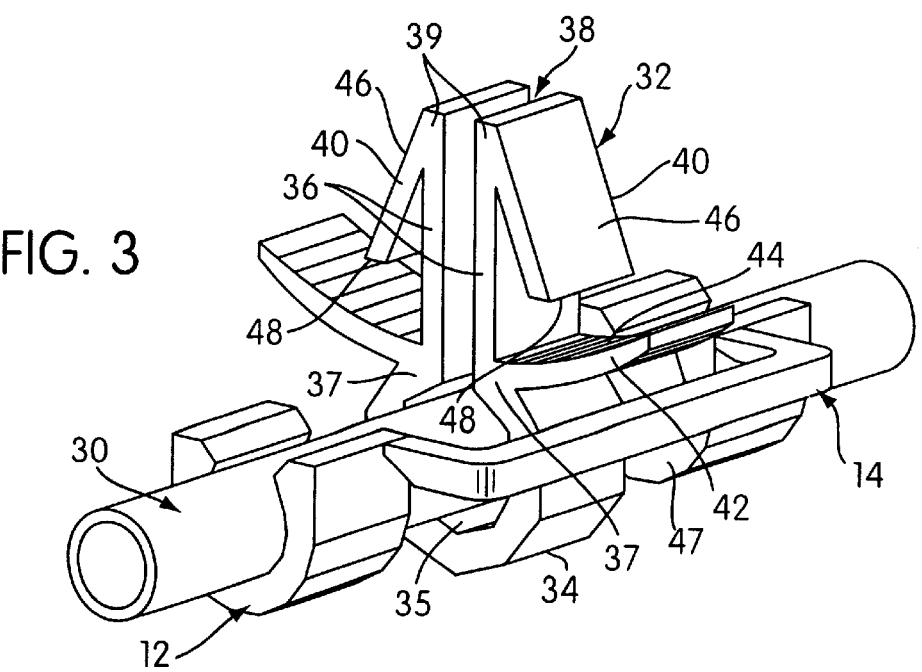
FIG. 3 is a perspective view of the movement restricting device in accordance with the present invention secured to a cable and shown in movement restricting relation with respect to a clip member attached in sliding relation with respect to the cable.

FIG. 3 shows the cable 30 disposed within the openings 17 defined by the "U"-shaped configuration of the tubular member securing portions 12, and a panel member engaging portion, generally indicated at 32, disposed in freely sliding relation with respect to the cable 30. The movement restricting portion 10 is grippingly secured to the cable 30 by virtue of the inward flexing of the tubular member securing portions 12 and is shown disposed in longitudinal movement restricting relation with respect to the panel member engaging portion 32.

It is to be understood that together the movement restricting portion 10 and the panel member engaging portion 32 together constitute a device for attaching an elongated tubular member to a panel member. However, it is within the scope of the present invention that the movement restricting portion 10 could be considered to be a device separate from the panel member engaging portion 32 and be utilized with any panel member engaging portion which has been slidably mounted on a cable or other tubular member.

The panel member engaging portion 32 is preferably made of a flexible plastic material and includes a tubular member surrounding portion 34 having an interior surface defining an opening 35 for slidably receiving the cable 30. The inner and outer arcuate surfaces of the tubular member surrounding portion 34 comprise a series of flat portions, each adjacent to the next as shown.

The tubular member surrounding portion 34 has a substantially "C-shaped" configuration which terminates in a pair of opposing end portions 37. The opposing end portions 37 of the tubular member surrounding portion 34 are connected with respective straight elongate portions 36 extending radially outwardly in a parallel relation to each other. The elongate portions 36 are generally perpendicular to a longitudinal axis passing through the center of the opening 35 defined by the tubular member surrounding portion 34. The two parallel elongate portions 36 are spaced apart to define a gap 38 therebetween which communicates with the opening 35. Each elongate portion 36 has an end 39 opposite the end 37 connected with the tubular member surrounding portion 34. Each end 39 is integrally formed with a locking portion 40 extending at an acute angle with respect to the associated elongate portion 36 and sloping progressively outwardly away from the elongate portion 36. A pair of arcuate biasing portions 42 extend in opposite directions laterally outwardly and upwardly from the end portions 37 at which each of the elongate portions 36 connect with the tubular surrounding portion 34. An arcuate upper surface 44 of each of the biasing portions 42 is formed from a series of interconnected flat surface portions 45 that enhance gripping action of the surface 44.

The panel member engaging portion 32 is connected with cable 30 by either sliding an end of the cable through the opening 35 defined by the tubular member surrounding portion 34 or by pushing the cable 30 through the gap 38 between the elongate portions 36 until the cable comes to rest within the opening 35 of the tubular member surrounding portion 34. The diameter of opening 35 is slightly greater than the outer diameter of cable 30 so that the panel member engaging portion 32 is permitted to slide longitudinally along the cable between securing portions 12. Securing portions 12 may thus also be considered or termed as clip movement restrictors which provide longitudinal movement limiting surfaces 47 facing longitudinally inwardly toward one another. FIG. 3 shows the longitudinal or axial movement limiting surfaces 47 disposed in a longitudinal movement restricting relationship with respect to the panel member engaging portion 32.

The panel member engaging portion 32 is attached to a panel or object (not shown) by pushing the locking portions 40 through an opening in the panel, thereby causing outer surfaces 46 of the locking portions 40 to engage opposite edges surrounding the opening, thus causing the locking portions 40 to be pushed or flexed inwardly toward one another. This action may also cause the parallel elongate members 36 to flex inwardly toward one another to allow the complete locking portions 40 to be pushed through the opening in the panel or object. Once the locking portions 40 are pushed completely through the opening in the panel or object, the elongate members 36 and/or locking portions 40 flex back outwardly so that the locking portions 40 return back to their original position. As a result, the panel member engaging portion 32 is secured within the opening in the panel or object.

As the panel member engaging portion 32 is secured to the panel or object, the surfaces 44 of the arcuate biasing portions 42 come into contact with the panel or object. The biasing portions 42 are caused to flex generally into or towards a substantially straight configuration against the portions of the panel or object surrounding the opening. Once the locking portions 40 are fully inserted into the opening, the biasing portions 42 apply a biasing force against the panel causing the panel member engaging portion 32 to be tightly and securely attached to the panel. More particularly, the portions of the panel surrounding the opening in the panel are preferably sandwiched between the surfaces 44 of the biasing portions 42 and the ends 48 of the respective locking portions 40.

Because the panel member engaging portion 32 is positioned between the tubular member securing portions 12, the relative axial movement of the panel member engaging portion 32 with respect to the cable is restricted by the longitudinal movement limiting surfaces 47 to a predetermined range along a short axial portion of the cable 30 between such securing portions or movement restrictors 12.

The present invention facilitates the securing of cables, rods, or the like to panels or objects by use of panel member engaging portion, such as panel member engaging portion 32. If no movement restrictor 10 is employed, a panel member engaging portion 32 which is not yet attached to a panel, for example, during an assembly process for an automobile door, will be able to move longitudinally freely along the cable, making the assembly process more difficult. The use of the movement restricting portion 10 causes the panel member engaging portion 32 to be restricted to a small portion of the cable, thereby making the panel member engaging portion easier to locate and position before engaging it with the fixed panel, and thus making it possible for the assembly process to proceed in a more quick and efficient manner.

It should be appreciated that the present invention contemplates that the movement restricting portion may only include two separate tubular member securing portions 12, and need not necessarily include a connecting member 14. In such case, the distance of restricted movement can be changed by changing the distance between the longitudinal movement limiting surfaces of the securing portions 12. It is also contemplated that this variable distance can be accomplished with the movement restricting portions 10 that include the connecting member 14 simply by positioning a pair of such movement restricting portions 10 on opposite sides of the panel member engaging portion.

It will be thus seen that the objects of the present invention have been fully and effectively accomplished. It will be realized, however, that the foregoing preferred specific embodiment has been shown for the purpose of illustrating the functional and structural principles of the present invention and is subject to change without departure from such principles. Therefore, the present invention includes all modifications encompassed within the spirit and scope of the following claims.

What is claimed is:

1. A device for attaching an elongated member to a panel member, said device comprising:

a panel engaging portion constructed and arranged for being slidably mounted on said elongated member for movement in a longitudinal direction along said elongated member, said panel engaging portion constructed and arranged for being fixedly engaged with the panel member; and a movement restricting portion constructed and arranged for being mounted on the elongated member in substantially fixed relation, said movement restricting portion comprising a pair of elongated member securing portions longitudinally spaced from one another and constructed and arranged for being grippingly engaged with the elongated member, said securing portions defining movement limiting surfaces, and a connecting member constructed and arranged to connect said securing portions to one another so that said movement limiting surfaces of said securing portions are fixed at a predetermined distance from one another, said movement limiting surfaces; being positioned and configured to restrict sliding longitudinal movement of said panel member engaging portion along the elongated member to a range therebetween.

2. The device of claim 1 wherein said panel member engaging portion comprises a elongated member surrounding portion having an interior surface which defines an opening configured to slidably receive the elongated member therein.

3. The device of claim 2 wherein said elongated member surrounding portion of said panel member engaging portion has a C-shaped configuration terminating in a pair of opposing end portions slightly spaced apart from one another, said panel member engaging portion further comprising a pair of elongate portions extending generally radially outwardly from said opposing end portions of said elongated member surrounding portion, said pair of elongate portions extending generally parallel to one another in a spaced apart relation so as to define a gap therebetween, said gap communicating with said opening defined by the interior surface of said elongated member surrounding portion, the elongated member being slidably received within said elongated member surrounding portion by either (1) slidably inserting one end of the elongated member into the said opening defined by the interior surface of said elongated member surrounding portion or (2) pushing the elongated member through the gap between said pair of elongate portions until it is slidably received within said opening defined by the interior surface of said elongated member surrounding portion.

4. The device of claim 3 wherein said pair of elongate portions are constructed and arranged for being inserted into an opening formed on the panel member to thereby fixedly engage said panel member engaging portion with the panel member.

5. The device of claim 4 wherein said pair of elongate portions each have a locking portion disposed on an outer end thereof, said locking portions being adapted to engage edges of the opening on the panel member as said pair of elongate portions are inserted therein such that said elongate portions are flexed inwardly toward one another, said elongate portions resiliently returning to their original, spaced apart positions as said locking portions pass through the opening such that said locking portions prevent said elongate portions from being withdrawn therefrom.

6. The device of claim 5 wherein said pair of elongate portions each include a biasing portion spaced radially inwardly from said locking portion thereof towards said elongated member surrounding portion, said biasing portions being adapted to engage the panel member as said locking portions pass through the opening therein so as to apply a biasing force against the panel member to thereby sandwich the panel member between said locking portions and said biasing portions and securely engage said panel member engaging portion therewith.

7. The device of claim 1 wherein said panel member engaging portion and said movement restricting portion are formed from a resilient plastic material.

8. device according to claim 1 wherein each of said elongated member securing portions has a generally U-shaped configuration with opposing leg portions and an arcuate gripping surface, said arcuate gripping surfaces being constructed and arranged to grippingly engage the exterior surface of the elongated member.

9. A device according to claim 8 wherein each of said arcuate gripping surfaces of said elongated member securing portions is a series of flat surfaces adjacent one another.

10. A device according to claim 8 wherein end portions of said opposing leg portions of said elongated member securing portions have angled surfaces sloping radially inwardly and toward one another, said angled surfaces being engaged by the exterior surface of the elongated member to initially flex said opposing leg portions outwardly as said elongated member is being pushed into an associated one of said elongated member securing portions, said opposing leg portions resiliently returning to their respective, original positions as the elongated member passes through said end portions to thereby grippingly engage said arcuate gripping surfaces therewith.

11. A device according to claim 8 wherein said elongated member securing portions each have an attachment portion extending outwardly from one of said leg portion thereof, said attachment portions being connected together by a connecting portion extending therebetween, said panel member engaging portion comprising a elongated member surrounding portion having an interior surface which defines an opening configured to slidably receive the elongated member therein, said panel member engaging portion comprising at least one elongate portion extending generally radially outwardly from said elongated member surrounding portion, said at least one elongate portion being constructed and arranged to fixedly engage said panel member engaging portion to the panel member.

12. A device according to claim 11 wherein said elongated member surrounding portion has a C-shaped configuration terminating in a pair of opposing end portions slightly spaced apart from one another, said at least one elongate portion comprising a pair of elongate portions extending generally radially outwardly from said opposing end portions of said elongated member surrounding portion, said pair of elongate portions extending generally parallel to one another in a spaced apart relation so as to define a gap therebetween, said gap communicating with said opening defined by the interior surface of said elongated member surrounding portion, the elongated member being slidably received within said elongated member surrounding portion by either (1)

slidably inserting one end of the elongated member into said opening defined by the interior surface of said elongated member surrounding portion or (2) by pushing the elongated member through the gap between the pair of elongate portions until it is slidably received within said opening defined by the interior surface of said elongated member surrounding portion.

13. The device of claim 12 wherein said pair of elongate portions each have a locking portion disposed on an outer end thereof, said locking portions being adapted to engage edges of an opening on the panel member as said pair of elongate portions are inserted therein such that said elongate portions are flexed inwardly toward one another, said elongate portions resiliently returning to their original, spaced apart positions as said locking portions pass through the opening such that said locking portions prevent said elongate portions from being withdrawn therefrom.

14. The device of claim 13 herein said pair of elongate portions each include a biasing portion spaced radially inwardly from said locking portion thereof towards said elongated member surrounding portion, said biasing portions being adapted to engage the panel member as said locking portions pass through the opening therein so as to apply a biasing force against the panel member to thereby sandwich the panel member between said locking portions and said biasing portions and securely engage said panel member engaging portion therewith.

15. A movement restricting device for being used with a panel member engaging portion slidably mounted on an elongated member, said engaging portion constructed and arranged for being fixedly engaged with a panel member so as to attach the elongated member to the panel member, said movement restricting device comprising:

a movement restricting portion having a pair of spaced-apart elongated member securing portions and a connecting portion interconnecting said securing portions so that said securing portions are fixed at a predetermined distance from each other, said securing portions being flexibly biased inwardly so as to be disposed in gripping engagement with the elongated member such that relative longitudinal movement of said movement restricting portion along said elongated member is substantially prevented, said securing portions having respective longitudinal movement limiting surfaces positioned and configured to restrict sliding longitudinal movement of said panel member engaging portion to a range therebetween.

16. A device according to claim 15 wherein each of said elongated member securing portions has a generally U-shaped configuration with opposing leg portions and an arcuate gripping surface, said arcuate gripping surfaces being constructed and arranged to grippingly engage the exterior surface of the elongated member.

17. A device for attaching an elongated member to a panel member, said device comprising:

a panel engaging portion constructed and arranged for being slidably mounted on said elongated member for movement along said elongated member in a longitudinal direction of said elongated member, said panel engaging portion constructed and arranged for being fixedly engaged with the panel member; and a movement restricting portion constructed and arranged for being mounted on the elongated member in substantially fixed relation, said movement restricting portion having a pair of longitudinally spaced securing portions which are flexibly biased inwardly into gripping relation with respect to said elongated member, said movement restricting portion further having a connecting portion that connects said securing portions in predetermined spaced relation to one another such that said securing portions restrict sliding longitudinal movement of said panel member engaging portion along the elongated member to a range therebetween.

18. A plurality of devices each in accordance with the device of claim 17, said plurality of devices comprising respective panel engaging portions and respective movement restricting portions, said movement restricting portions constructed and arranged for being spaced at desired distances from one another so as to position said panel engaging portions at desired locations on said elongated member for securement to said panel.

* * * * *